United States Patent
Shi et al.

(10) Patent No.: US 12,320,442 B2
(45) Date of Patent: Jun. 3, 2025

(54) MAGNET-DRIVEN FIRE DAMPER FOR OXYGENERATOR

(71) Applicant: LONGFIAN SCITECH CO., LTD., Baoding (CN)

(72) Inventors: Baozhu Shi, Baoding (CN); Lei Shi, Baoding (CN); Xiaoxiong Li, Baoding (CN); Bo Zhu, Baoding (CN)

(73) Assignee: LONGFIAN SCITECH CO., LTD., Baoding (CN)

( * ) Notice: Subject to any disclaimer, the term of this patent is extended or adjusted under 35 U.S.C. 154(b) by 97 days.

(21) Appl. No.: 18/361,074

(22) Filed: Jul. 28, 2023

(65) Prior Publication Data
US 2025/0003520 A1    Jan. 2, 2025

(30) Foreign Application Priority Data
Jun. 28, 2023    (CN) .......................... 202321659681.3

(51) Int. Cl.
  *F16K 31/08*    (2006.01)
  *F16K 17/38*    (2006.01)
  *F16K 31/06*    (2006.01)

(52) U.S. Cl.
  CPC .......... *F16K 31/086* (2013.01); *F16K 17/383* (2013.01); *F16K 31/0658* (2013.01)

(58) Field of Classification Search
  CPC ... F16K 31/086; F16K 31/0658; F16K 17/383
  See application file for complete search history.

(56) References Cited

U.S. PATENT DOCUMENTS

| | | | | | |
|---|---|---|---|---|---|
| 2,667,895 | A | * | 2/1954 | Pool | F16K 15/021 235/201 ME |
| 3,297,843 | A | * | 1/1967 | Hoss | H01H 35/405 200/34 |
| 3,364,897 | A | * | 1/1968 | Mouwen | B01D 35/143 210/90 |
| 4,809,713 | A | * | 3/1989 | Grayzel | A61N 1/057 607/116 |
| 6,673,051 | B2 | * | 1/2004 | Flinchbaugh | A61M 25/04 604/247 |

(Continued)

FOREIGN PATENT DOCUMENTS

| CN | 204201225 U | 3/2015 |
|---|---|---|
| CN | 209245361 U | 8/2019 |
| CN | 216813061 U | 6/2022 |

*Primary Examiner* — Umashankar Venkatesan

(57) ABSTRACT

The present application discloses a magnet-driven fire damper for an oxygenerator, which includes a rear valve housing, a front valve housing and a fusible valve core, and further includes a static magnet and a moving magnet, wherein the static magnet is fixedly mounted at a front end of a middle hole of the rear valve housing and does not affect the passage of oxygen, and the moving magnet is fixedly connected to a rear end of the fusible valve core and is provided opposite to the static magnet; the opposing faces of the static magnet and the moving magnet are of the same polarity. In the present application, a magnet-driven fire damper for an oxygenerator, mutually exclusive magnets are used as a driving unit of a fusible valve core, avoiding the influence of water vapor, and being sensitive and reliable in operation.

19 Claims, 8 Drawing Sheets

(56) References Cited

U.S. PATENT DOCUMENTS

| | | | |
|---|---|---|---|
| 8,602,048 B2* | 12/2013 | Radford | F16K 17/383 137/75 |
| 9,320,882 B2* | 4/2016 | McDaniel | A61M 39/227 |
| 10,406,391 B2* | 9/2019 | Peel | A61M 16/208 |
| 2022/0280819 A1* | 9/2022 | Johnson | A62C 2/04 |

* cited by examiner

MAGNET-DRIVEN FIRE DAMPER FOR OXYGENERATOR

CROSS-REFERENCE TO RELATED APPLICATIONS

The application claims priority to Chinese patent application No. 202321659681.3, filed on Jun. 28, 2023, the entire contents of which are incorporated herein by reference.

TECHNICAL FIELD

The present application relates to the technical field of a fire damper for an oxygenerator, in particular to a magnet-driven fire damper for an oxygenerator.

BACKGROUND

If a tempering blocking device is not provided on an output pipeline of an oxygenerator, when an open flame occurs at one end with oxygen being used, an oxygen intake pipeline may ignite and spread into an oxygenerator equipment, which may cause serious consequences.

The application with the publication number CN 205896321U for a fire damper for an oxygenerator is a prior application patent of the applicant. The technical solution of the patent includes a flame-retardant plastic cavity, a fusible plug and a spring, wherein the flame-retardant plastic cavity includes a first cavity and a second cavity which are threadedly connected together, a non-threaded connection end of the first cavity is provided as an air outlet end, a non-threaded connection end of the second cavity is provided as an air inlet end, the fusible plug includes a large end and a small end, the small end is mounted in the first cavity, the large end is mounted in the second cavity, an O-ring is provided at a transition between the large end and the small end, the spring is mounted in the second cavity, and one end of the spring abuts against a top surface of the large end of the fusible plug, and the other end of the spring bears against a stepped surface of a bore in the second cavity. The application is ingenious in design, compact and reasonable in structure, convenient and quick in installation, can be connected according to the gas direction, and can be used alone or in combination, and the safety is high; an integral part of the fire damper is composed of a fire-retardant material, and does not continue to burn after isolation of oxygen.

However, since a spring is used as a reset driving unit of a fusible plug according to the technical solution of the patent, during a long-term oxygen supply operation, oxygen will carry part of water vapor through the fire damper, and water vapor will slowly corrode the spring, causing rust and even failure of the spring, and cannot push a fusible plug in time when an open flame tempering occurs, causing fire-proof failure.

Therefore, there is a need for a magnet-driven fire damper for an oxygenerator that addresses the above problems.

SUMMARY

The present application provides a magnet-driven fire damper for an oxygenerator, mutually exclusive magnets are used as a driving unit of a fusible valve core, avoiding the influence of water vapor, and being sensitive and reliable in operation.

The present application relates to a magnet-driven fire damper for an oxygenerator including a rear valve housing, a front valve housing and a fusible valve core, further including a static magnet and a moving magnet, wherein the static magnet is fixedly mounted at a front end of a middle hole of the rear valve housing and does not affect the passage of oxygen, and the moving magnet is fixedly connected to a rear end of the fusible valve core and is provided opposite to the static magnet; the opposing faces of the static magnet and the moving magnet are of the same polarity.

Further, a mounting circular groove with an increased diameter is provided at the front end of the middle hole of the rear valve housing, the static magnet is mounted in the mounting circular groove, an air passage hole is provided in the middle of the static magnet, and the air passage hole is provided in coaxial communication with the middle hole of the rear valve housing.

Further, the rear end of the fusible valve core is a big head end, a head of the big head end is coaxially provided with a clamping groove, and the moving magnet root is clamped in the clamping groove.

Further, the fusible valve core further includes claws, a plurality of the claws are uniformly distributed outside of the clamping groove, and a top end of the claws presses a rear end face of the moving magnet.

Further, an end face of the static magnet facing the moving magnet is provided with a marking area indicating a magnetic pole property of this end face of the static magnet; an end face of the corresponding moving magnet facing the static magnet is also provided with a marker indicating polarity.

Further, a fretwork slot hole is provided at a tapered portion of the fusible valve core, the fretwork slot hole extends along a length direction of an axial center line of the fusible valve core and is centrally opened, and the fretwork slot hole is provided at one end near a blocking head.

Further, the length of the fretwork slot hole is not less than 1.5 times of a sealing stroke in a tempering action of the fusible valve core.

Further, a central axis through the fretwork slot hole is perpendicular to an axial center line in a direction of a long side of the blocking head.

Further, a tapered hole of the front valve housing is provided with a receding annular groove at a position corresponding to the fretwork slot hole.

Further, a length of the receding annular groove is not less than the length of the fretwork slot hole.

Compared with the prior art, the beneficial technical effects of the present application are:

The present application relates to a magnet-driven fire damper for an oxygenerator, by means of the arrangement of a static magnet and a moving magnet, a fusible valve core is continuously pushed forward with the pushing force of the two magnets repelling each other; with respect to the original spring compression method, the two are non-contact magnetic forces, and the water vapor entrained in oxygen does not affect the magnets, and therefore the operation is reliable and has good stability.

In addition, by providing the mounting circular groove to clamp the static magnet, it is easy to realize and the static magnet is not removed from the front end face by the opposite repulsive force of the moving magnet, so that the stability is good. By providing an air passage hole in the middle of the static magnet, the oxygen output by the oxygenerator can pass smoothly. Through the arrangement of the clamping groove and the claws, the moving magnet can be fixed in a wrapped manner to prevent the moving magnet from becoming loose relative to the fusible valve core. By providing markers indicating the polarity on the opposite end faces of the static magnet and the moving magnet, it is possible to avoid the occurrence of fireproofing failure due to the polarity in assembly. By providing a fretwork slot hole in a tapered portion of the fusible valve core at an end close to the blocking head, a fusing response sensitive area is formed, the weakest part in the area which is tempering combusted first would be softened or fused, so that the fusible valve core is quickly pushed forward and quickly responds to cut-off flame propagation. By providing a receding annular groove corresponding to the fretwork slot hole at the front end of a tapered surface hole of the front valve housing, if the tempering open flame is too weak to fuse the legs at both sides of the fretwork slot hole, so that the legs are softened, and after being pushed by the magnet, the two legs are folded and extruded outwards, so that the receding space provided by the receding annular groove can increase the material volume of the legs, ensure that the fusible valve core moves for a sufficient sealing stroke, and complete closing the valve to prevent fire.

BRIEF DESCRIPTION OF DRAWINGS

The present application is further described below in conjunction with the description of the drawings.

Figure 1:
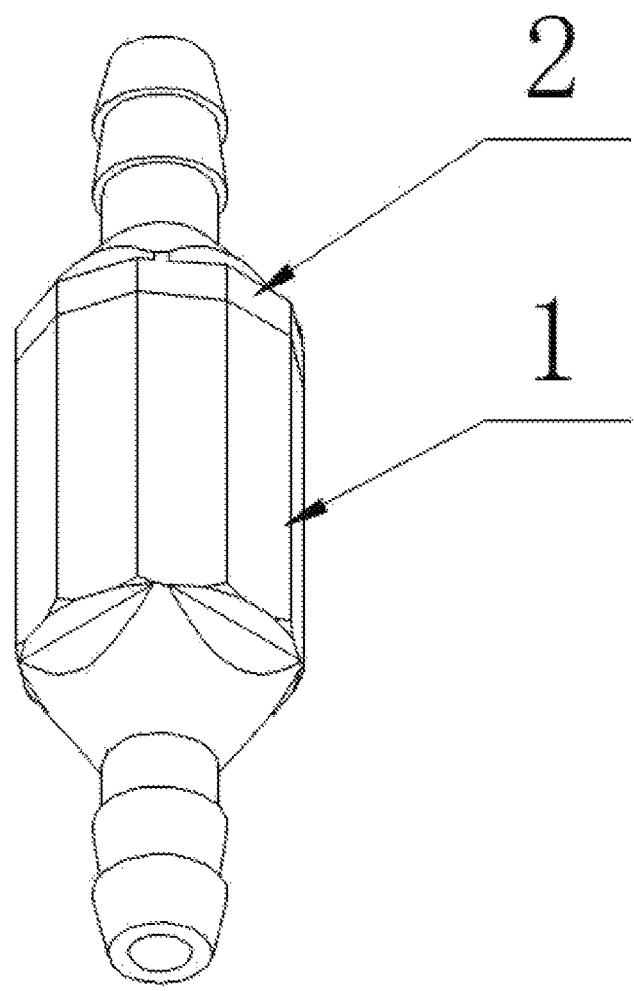
FIG. 1 is a schematic diagram showing a three-dimensional structure of a magnet-driven fire damper for an oxygenerator according to the present application.

Reference numerals: 1. rear valve housing; 2. front valve housing; 201. sealed tapered surface; 202. welding section; 203. air outlet; 204. receding annular groove; 3. fusible valve core; 301. blocking head; 302. clamping groove; 303. claws; 304. ring flange; 305. fretwork slot hole; 4. static magnet; 401. air passage hole; 402. marking area; 5. moving magnet; 6. first sealing ring; 7. second sealing ring.

DETAILED DESCRIPTION OF THE EMBODIMENTS

The core of the present application is to provide a magnet-driven fire damper for an oxygenerator, mutually exclusive magnets are used as a driving unit of a fusible valve core, avoiding the influence of water vapor, and being sensitive and reliable in operation.

In describing the present application, it is to be understood that the terms "upper", "lower", "front", "rear", "left", "right", "top", "bottom", "inner", "outer", and the like, indicate orientations or positional relationships based on the orientations or positional relationships shown in the drawings, are merely for convenience in describing the present application and simplifying the description, and do not indicate or imply that the device or element referred to must have a particular orientation, be constructed in a particular orientation, and be operated, and therefore, should not be construed as limiting the present application.

Embodiment 1

In an embodiment, as shown in FIGS. 1-5, a magnet-driven fire damper for an oxygenerator includes a rear valve housing 1, a front valve housing 2 and a fusible valve core 3. Similar to the prior application CN 205896321U, the rear valve housing 1, the front valve housing 2 and the fusible valve core 3 are respectively equivalent to a second cavity 5, a first cavity 3 and a fusible plug 2 in the prior application, and the fusible valve core 3 is assembled in the cavity after the rear valve housing 1 and the front valve housing 2 are butted. A tapered portion of the fusible valve core 3 is adapted to a middle tapered hole of the front valve housing 2, a blocking head 301 is provided at a front end of the fusible valve core 3, the blocking head 301 is a cylinder and is provided perpendicular to an axis of the fusible valve core 3, and the blocking head 301 is clamped on an inner end face of an air outlet hole 203 at the front end of the front valve housing 2. The fusible valve core 3 is made of flame-retardant ABS plastic. The rear valve housing 1 and the front valve housing 2 may be ultrasonically welded together, i.e. an inner hole at the front end of the rear valve housing 1 is sleeved onto a welding section 202 at the rear end of the front valve housing 2 and welded together using an ultrasonic welding device. Of course, the rear valve housing 1 and the front valve housing 2 may be clamped or threadably connected. The rear housing 1 and the front housing 2 are sealed with a static second seal 7. An important difference from the prior art is that the magnet-driven fire damper for an oxygenerator according to the present application further includes a static magnet 4 fixedly mounted at a front end of the central hole of the rear valve housing 1 and does not affect the passage of oxygen, and a moving magnet 5 fixedly connected to the rear end of the fusible valve core 3 and provided opposite to the static magnet 4. The opposite faces of the static magnet 4 and the moving magnet 5 are of the same polarity. The static magnet 4 repels the moving magnet 5 in a tendency to move relatively away from the static magnet 4.

By means of the arrangement of a static magnet 4 and a moving magnet 5, a fusible valve core 3 is continuously pushed forward with the pushing force of the two magnets repelling each other; with respect to the original spring compression method, the two are non-contact magnetic forces, and the water vapor entrained in oxygen does not affect the magnets, and therefore the operation is reliable and has good stability.

Figure 2:
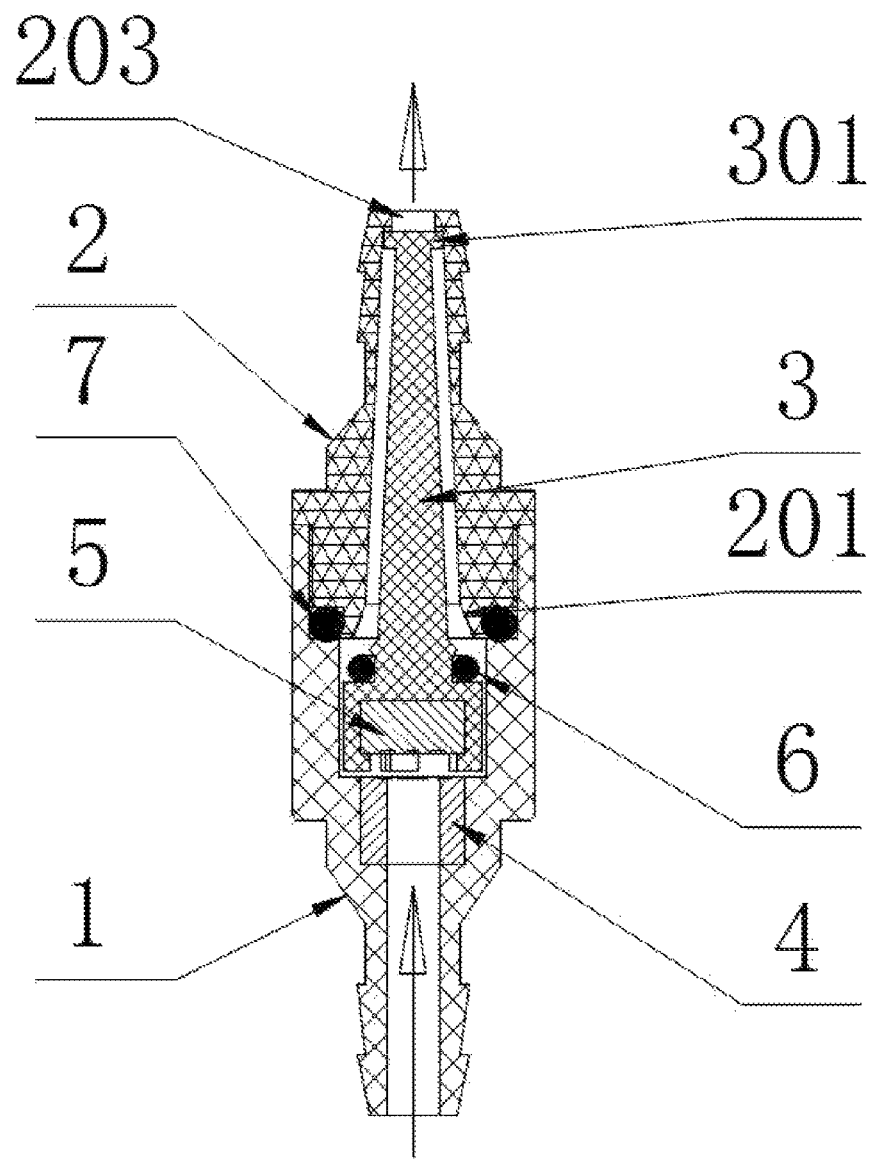
FIG. 2 is a schematic diagram showing a main cross-sectional structure of a magnet-driven fire damper for an oxygenerator according to the present application.
Figure 5:
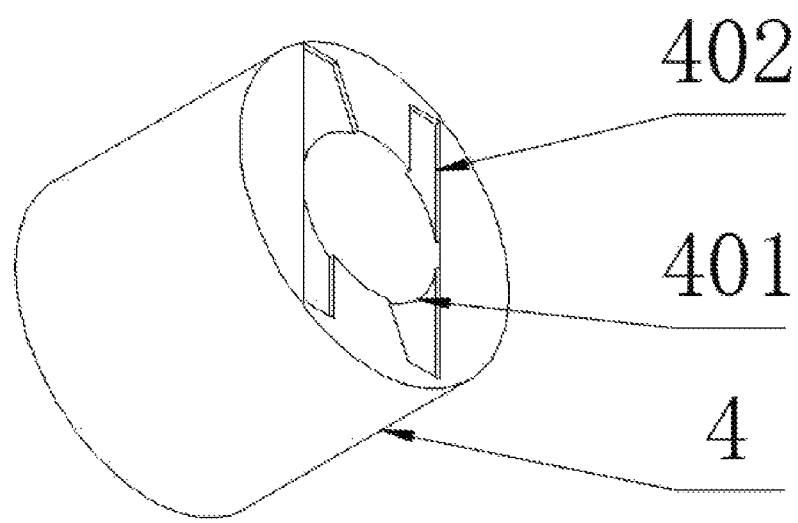
FIG. 5 is a schematic diagram showing a three-dimensional structure of the static magnet according to the present application.

In an implementation of this embodiment, as shown in FIGS. 2 and 5, a mounting circular groove with an increased diameter is provided at the front end of the middle hole of the rear valve housing 1, the static magnet 4 is mounted in the mounting circular groove, an air passage hole 401 is provided in the middle of the static magnet 4, and the air passage hole 401 is provided in coaxial communication with the middle hole of the rear valve housing 1. The static magnet 4 has a circular cylindrical shape.

By providing the mounting circular groove to clamp the static magnet 4, it is easy to realize and the static magnet 4 is not removed from the front end face by the opposite repulsive force of the moving magnet 5, so that the stability is good. By providing an air passage hole 401 in the middle of the static magnet 4, the oxygen output by the oxygenerator can be smoothly passed.

Figure 4:
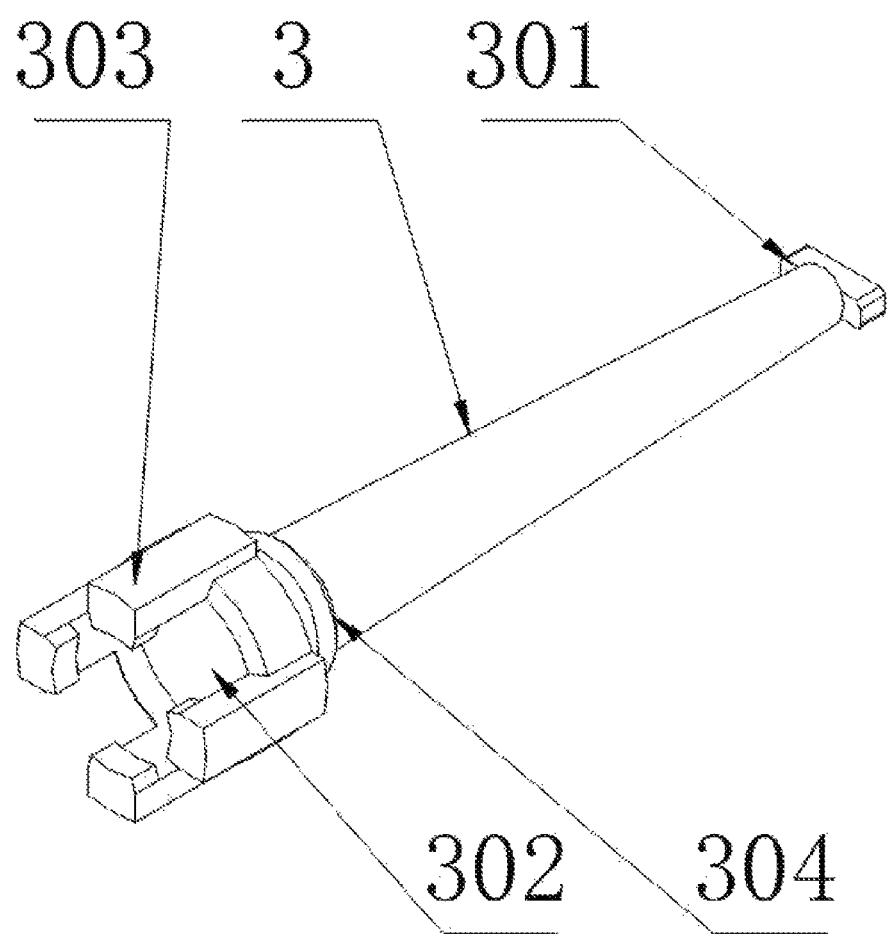
FIG. 4 is a schematic diagram showing a three-dimensional structure of the fusible valve core according to the present application.

In an implementation of this embodiment, as shown in FIGS. 2 and 4, a rear end of the fusible valve core 3 is a big head end, the head end of the big head end is coaxially provided with a clamping groove 302, and a root of the moving magnet 5 is clamped in the clamping groove 302. The clamping groove 302 is a circular groove, and the moving magnet 5 is a cylindrical magnet.

Specifically, a ring flange 304 is provided at the root of the tapered portion of the fusible valve core 3, a first sealing ring 6 is mounted between the ring flange 304 and the front end face of the big head end, and the first sealing ring 6 action is performed, the first sealing ring 6 can be in close contact with the sealed tapered surface 201 of the front valve housing 2 to form a seal.

Specifically, as shown in FIGS. 2 and 4, the fusible valve core 3 further includes a plurality of claws 303, wherein the plurality of claws 303 are uniformly distributed at a circumference outside the clamping groove 302, and a top end of the claws 303 presses the rear end face of the moving magnet 5. The claws 303 are specifically made of a plastic material having elasticity, and when the moving magnet 5 is assembled, the claws 303 can be shaken to recede to allow the moving magnet 5 to be installed. Specifically, the number of the claws 303 is four, and the four claws 303 uniformly hold the moving magnet 5 to prevent the moving magnet 5 from falling outward.

Through the arrangement of the clamping groove 302 and the claws 303, the moving magnet 5 can be fixed in a wrapped manner to prevent the moving magnet 5 from becoming loose relative to the fusible valve core 3.

In an implementation of this embodiment, as shown in FIGS. 2 and 5, an end face of the static magnet 4 facing the moving magnet 5 is provided with a marking area 402, and the marking area 402 indicates the magnetic pole property of this end face of the static magnet 4, and in particular, the marking area 402 is marked with an "N", and the mark can be processed by engraving to remove material or printing. The end face of the corresponding moving magnet 5 facing the static magnet 4 is also provided with a marker indicating polarity, and in particular, the rear end face of the moving magnet 5 is also marked with a marker "N".

Obviously, the marking area 402 can also be marked with an "S", and similar marking manners fall within the scope of protection of the present application.

By providing markers indicating the polarity on the opposite end faces of the static magnet 4 and the moving magnet 5, it is possible to avoid the occurrence of fireproofing failure due to the polarity in assembly.

Figure 3:
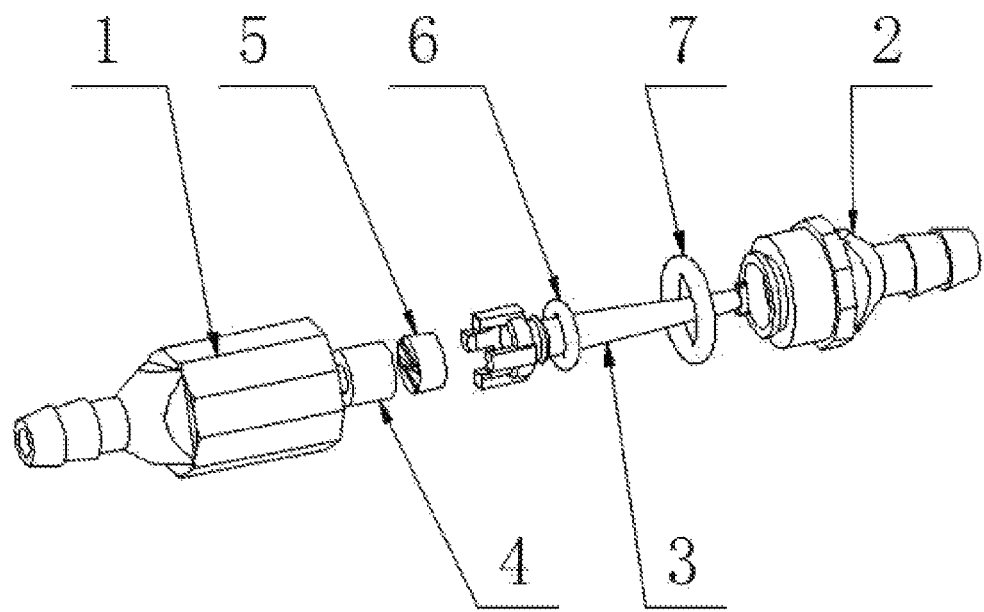
FIG. 3 is an explosion diagram showing a magnet-driven fire damper for an oxygenerator according to the present application.

The working process of the magnet-driven fire damper for an oxygenerator according to the present application is as follows: firstly, as shown in FIGS. 2 and 3, the direction of an arrow in the figures is an oxygen delivery direction, an outlet end of a front valve housing 2 is connected to a silica gel tube of an oxygen inhalation nasal oxygen tube, and an inlet end of a rear valve housing 1 is connected to an oxygen outlet pipe of an oxygenerator. Under normal operation of the oxygenerator, oxygen flows forward through the middle hole of a rear valve housing 1 and an air passage hole 401, around a large end of the rear end of a fusible valve core 3, along a gap between a tapered portion of the fusible valve core 3 and a middle tapered hole of a front valve housing 2, around a blocking head 301, and preferably into a silicone tube of a nasal oxygen tube through an air outlet hole 203. When the nasal oxygen tube catches fire due to an accident, the tempering spreads to the fire damper of the present application, and first contacts the fusible valve core 3, so that the top of the fusible valve core 3 is fused; the static magnet 4 repels and pushes the moving magnet 5 forward; the moving magnet 5 moves forward with the fusible valve core 3 until the first sealing ring 6 is in close contact with the sealed tapered surface 201 of the front valve housing 2, forming a pressure-tight seal; and the pipeline is closed to isolate oxygen to achieve the purpose of fireproofing.

Embodiment 2

This embodiment is formed by modifying the fusible valve core 3 on the basis of the above Embodiment 1. As shown in FIGS. 6-9, a fretwork slot hole 305 is provided at the tapered portion of the fusible valve core 3, the fretwork slot hole 305 extends along the length direction of an axial center line of the fusible valve core 3 and is centrally provided, and the fretwork slot hole 305 is provided at one end close to the blocking head 301.

Figure 6:
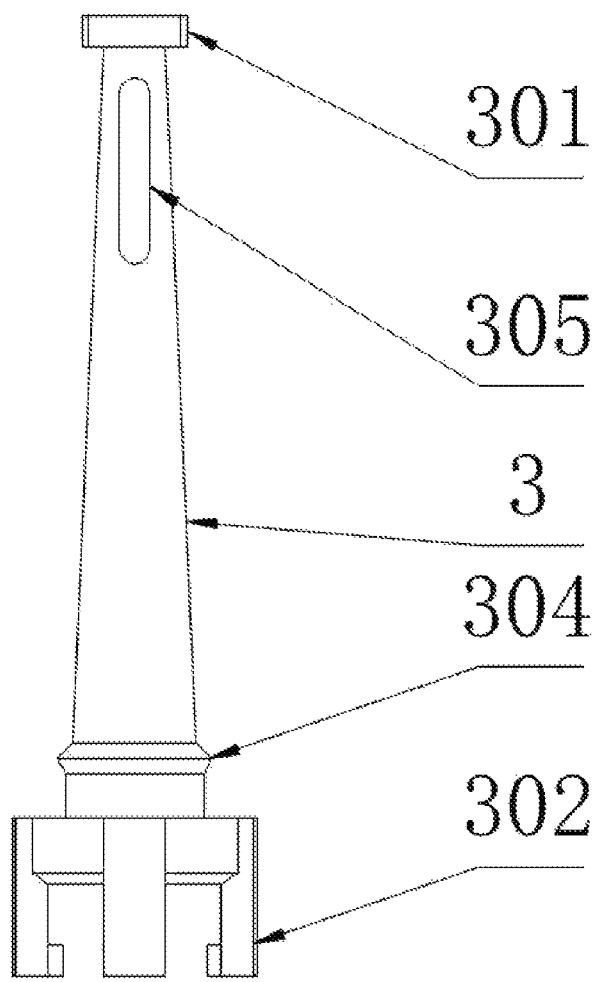
FIG. 6 is a schematic diagram showing the main structure of a fusible valve core according to another embodiment of the present application.
Figure 7:
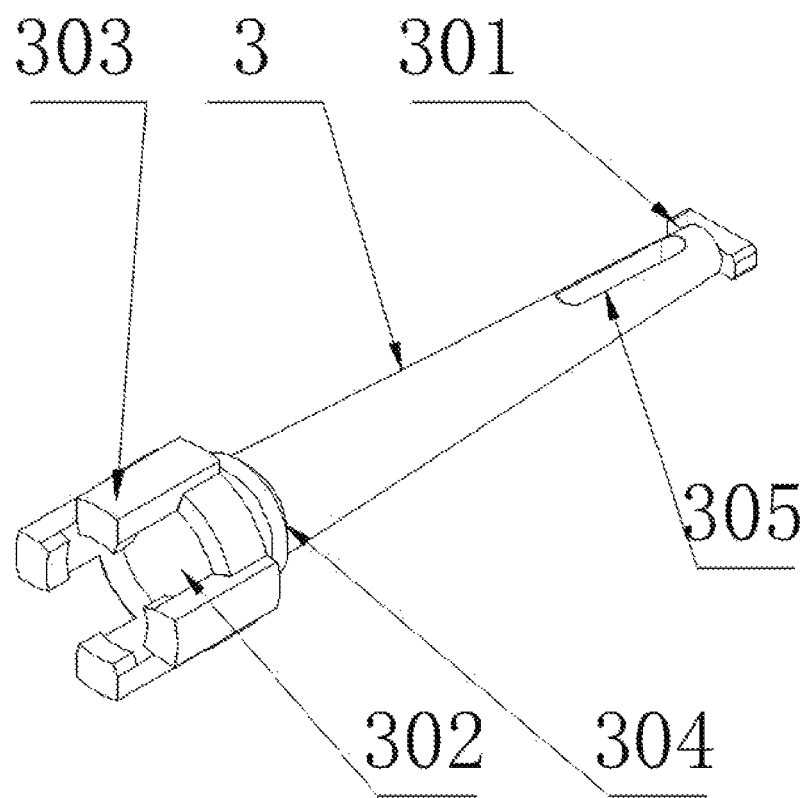
FIG. 7 is a schematic diagram showing a three-dimensional structure of a fusible valve core according to another embodiment of the present application.

Specifically, as shown in FIGS. 6 and 7, the length of the fretwork slot hole 305 is not less than 1.5 times the sealing stroke in a tempering action of the fusible valve core 3. That is to say, when tempering occurs, for example, a passive magnet 5 of the fusible valve core 3 pushes forward by 3 mm, and the first sealing ring 6 can be pressed against the sealed tapered surface 201 of the front valve housing 2 to form a sealing barrier. Then, the length of the fretwork slot hole 305 should not be less than 4.5 mm.

Specifically, as shown in FIGS. 6 and 7, a central axis through the fretwork slot hole 305 is perpendicular to the axial center line in a direction of a long side of the blocking head 301. That is, the fretwork slot hole 305 is substantially perpendicular to the blocking head 301.

By providing a fretwork slot hole 305 in a tapered portion of the fusible valve core 3 at an end close to the blocking head 301, a fusing response sensitive area is formed, the weakest part in the area which is tempering combusted first would be softened or fused, so that the fusible valve core 3 is quickly pushed forward and quickly responds to cut-off flame propagation.

In an implementation of this embodiment, as shown in FIG. 7, the tapered hole of the front valve housing 2 is provided with a receding annular groove 204 at a position corresponding to the fretwork slot hole 305. The diameter of the receding annular groove 204 is allowed to expand and ensure that the pagoda head connection portion of the front valve housing 2 has sufficient wall thickness and strength.

Figure 8:
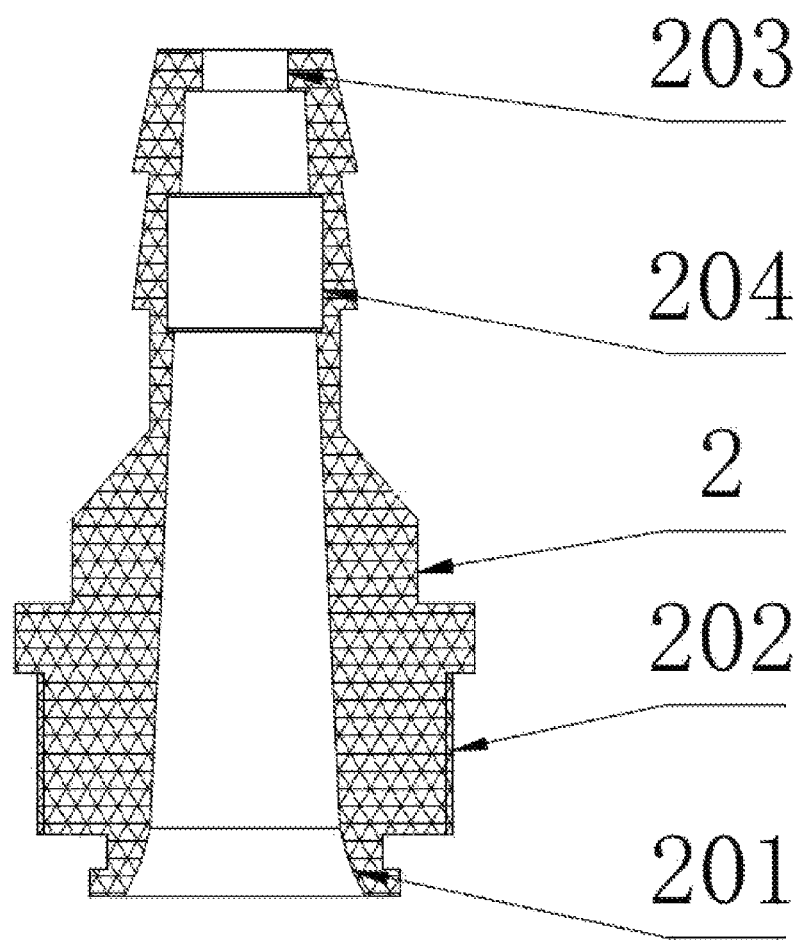
FIG. 8 is a schematic diagram showing a main cross-sectional structure of a front valve housing according to another embodiment of the present application.

Specifically, as shown in FIGS. 6-8, the length of the receding annular groove 204 is not less than the length of the fretwork slot hole 305.

By providing a receding annular groove 204 corresponding to the fretwork slot hole 305 at the front end of a tapered surface hole of the front valve housing 2, if the tempering open flame is too weak to fuse the legs at both sides of the fretwork slot hole 305, so that the legs are softened, and after being pushed by the magnet, the two legs are folded and extruded outwards, so that the receding space provided by the receding annular groove 204 can increase the material volume of the legs, ensure that the fusible valve core 3 moves for a sufficient sealing stroke, and complete closing the valve to prevent fire.

The present application relates to a magnet-driven fire damper for an oxygenator, by means of the arrangement of a static magnet 4 and a moving magnet 5, a fusible valve core 3 is continuously pushed forward with the pushing force of the two magnets repelling each other; with respect to the original spring compression method, the two are non-contact magnetic forces, and the water vapor entrained in oxygen does not affect the magnets, and therefore the operation is reliable and has good stability. In addition, by providing the mounting circular groove to clamp the static magnet 4, it is easy to realize and the static magnet 4 is not removed from the front end face by the opposite repulsive force of the moving magnet 5, so that the stability is good. By providing an air passage hole 401 in the middle of the static magnet 4, the oxygen output by the oxygenator can be smoothly passed. Through the arrangement of the clamping groove 302 and the claws 303, the moving magnet 5 can be fixed in a wrapped manner to prevent the moving magnet 5 from becoming loose relative to the fusible valve core 3. By providing markers indicating the polarity on the opposite end faces of the static magnet 4 and the moving magnet 5, it is possible to avoid the occurrence of fireproofing failure due to the polarity in assembly. By providing a fretwork slot hole 305 in a tapered portion of the fusible valve core 3 at an end close to the blocking head 301, a fusing response sensitive area is formed, the weakest part in the area which is tempering combusted first would be softened or fused, so that the fusible valve core 3 is quickly pushed forward and quickly responds to cut-off flame propagation. By providing a receding annular groove 204 corresponding to the fretwork slot hole 305 at the front end of a tapered surface hole of the front valve housing 2, if the tempering open flame is too weak to fuse the legs at both sides of the fretwork slot hole 305, so that the legs are softened, and after being pushed by the magnet, the two legs are folded and extruded outwards, so that the receding space provided by the receding annular groove 204 can increase the material volume of the legs, ensure that the fusible valve core 3 moves for a sufficient sealing stroke, and complete closing the valve to prevent fire.

Various embodiments are described in this description in a progressive manner, with each embodiment focusing on differences from the other embodiments, with like parts referring to each other. The apparatus disclosed in the examples is relatively simple to describe, since it corresponds to the method disclosed in the examples, as explained in the method section.

The above-mentioned embodiments merely describe the preferred modes of the present application and do not limit the scope of the present application, and various modifications and improvements made to the technical solutions of the present application by those skilled in the art without departing from the design spirit of the present application shall fall within the scope of protection defined by the claims of the present application.

What is claimed is:

1. A magnet-driven fire damper for an oxygenator comprising a rear valve housing, a front valve housing and a fusible valve core, further comprising a static magnet and a moving magnet, wherein the static magnet is fixedly mounted at a front end of a middle hole of the rear valve housing and does not affect the passage of oxygen, and the moving magnet is fixedly connected to a rear end of the fusible valve core and is provided opposite to the static magnet; the opposing faces of the static magnet and the moving magnet are of the same polarity, wherein a mounting circular groove with an increased diameter is provided at the front end of the middle hole of the rear valve housing, the static magnet is mounted in the mounting circular groove, an air passage hole is provided in the middle of the static magnet, and the air passage hole is provided in coaxial communication with the middle hole of the rear valve housing.

2. The magnet-driven fire damper for an oxygenator according to claim 1, wherein the rear end of the fusible valve core is a big head end, a head of the big head end is coaxially provided with a clamping groove, and the moving magnet root is clamped in the clamping groove.

3. The magnet-driven fire damper for an oxygenator according to claim 2, wherein the fusible valve core further comprises claws, a plurality of the claws are uniformly distributed outside of the clamping groove, and a top end of the claws presses a rear end face of the moving magnet.

4. The magnet-driven fire damper for an oxygenator according to claim 1, wherein an end face of the static magnet facing the moving magnet is provided with a marking area, and the marking area indicates a magnetic pole property of the end face of the static magnet; an end face of the corresponding moving magnet facing the static magnet is also provided with a marker indicating polarity.

5. The magnet-driven fire damper for an oxygenator according to claim 1, wherein a fretwork slot hole is provided at a tapered portion of the fusible valve core, the fretwork slot hole extends along a length direction of an axial center line of the fusible valve core and is centrally opened, and the fretwork slot hole is provided at one end near a blocking head.

6. The magnet-driven fire damper for an oxygenator according to claim 5, wherein the length of the fretwork slot hole is not less than 1.5 times of a sealing stroke in a tempering action of the fusible valve core.

7. The magnet-driven fire damper for an oxygenator according to claim 6, wherein a tapered hole of the front valve housing is provided with a receding annular groove at a position corresponding to the fretwork slot hole.

8. The magnet-driven fire damper for an oxygenator according to claim 7, wherein a length of the receding annular groove is not less than the length of the fretwork slot hole.

9. The magnet-driven fire damper for an oxygenator according to claim 5, wherein a central axis through the fretwork slot hole is perpendicular to an axial center line in a direction of a long side of the blocking head.

10. A magnet-driven fire damper for an oxygenator comprising a rear valve housing, a front valve housing and a fusible valve core, further comprising a static magnet and a moving magnet, wherein the static magnet is fixedly mounted at a front end of a middle hole of the rear valve housing and does not affect the passage of oxygen, and the moving magnet is fixedly connected to a rear end of the fusible valve core and is provided opposite to the static magnet; the opposing faces of the static magnet and the moving magnet are of the same polarity, wherein the rear end of the fusible valve core is a big head end, a head of the big head end is coaxially provided with a clamping groove, and the moving magnet root is clamped in the clamping groove.

11. The magnet-driven fire damper for an oxygenator according to claim 10, wherein a mounting circular groove with an increased diameter is provided at the front end of the middle hole of the rear valve housing, the static magnet is mounted in the mounting circular groove, an air passage hole is provided in the middle of the static magnet, and the air passage hole is provided in coaxial communication with the middle hole of the rear valve housing.

12. The magnet-driven fire damper for an oxygenerator according to claim 10, wherein the fusible valve core further comprises claws, a plurality of the claws are uniformly distributed outside of the clamping groove, and a top end of the claws presses a rear end face of the moving magnet.

13. The magnet-driven fire damper for an oxygenerator according to claim 10, wherein an end face of the static magnet facing the moving magnet is provided with a marking area, and the marking area indicates a magnetic pole property of the end face of the static magnet; an end face of the corresponding moving magnet facing the static magnet is also provided with a marker indicating polarity.

14. The magnet-driven fire damper for an oxygenerator according to claim 10, wherein a fretwork slot hole is provided at a tapered portion of the fusible valve core, the fretwork slot hole extends along a length direction of an axial center line of the fusible valve core and is centrally opened, and the fretwork slot hole is provided at one end near a blocking head.

15. The magnet-driven fire damper for an oxygenerator according to claim 14, wherein the length of the fretwork slot hole is not less than 1.5 times of a sealing stroke in a tempering action of the fusible valve core.

16. The magnet-driven fire damper for an oxygenerator according to claim 15, wherein a tapered hole of the front valve housing is provided with a receding annular groove at a position corresponding to the fretwork slot hole.

17. The magnet-driven fire damper for an oxygenerator according to claim 16, wherein a length of the receding annular groove is not less than the length of the fretwork slot hole.

18. The magnet-driven fire damper for an oxygenerator according to claim 14, wherein a central axis through the fretwork slot hole is perpendicular to an axial center line in a direction of a long side of the blocking head.

19. A magnet-driven fire damper for an oxygenerator comprising a rear valve housing, a front valve housing and a fusible valve core, further comprising a static magnet and a moving magnet, wherein the static magnet is fixedly mounted at a front end of a middle hole of the rear valve housing and does not affect the passage of oxygen, and the moving magnet is fixedly connected to a rear end of the fusible valve core and is provided opposite to the static magnet; the opposing faces of the static magnet and the moving magnet are of the same polarity, wherein a fretwork slot hole is provided at a tapered portion of the fusible valve core, the fretwork slot hole extends along a length direction of an axial center line of the fusible valve core and is centrally opened, and the fretwork slot hole is provided at one end near a blocking head.

* * * * *